United States Patent
Bax et al.

(10) Patent No.: US 10,849,728 B2
(45) Date of Patent: Dec. 1, 2020

(54) ATTACHMENT WITH IDENTIFICATION FOR PERSONAL CARE APPLIANCE AND METHOD

(71) Applicant: KONINKLIJKE PHILIPS N.V., Eindhoven (NL)

(72) Inventors: Pieter Johannes Bax, Drachten (NL); Gertrude Riette Van Der Kamp, Den Helder (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 672 days.

(21) Appl. No.: 15/510,785

(22) PCT Filed: Aug. 10, 2015

(86) PCT No.: PCT/IB2015/056073
§ 371 (c)(1),
(2) Date: Mar. 13, 2017

(87) PCT Pub. No.: WO2016/042427
PCT Pub. Date: Mar. 24, 2016

(65) Prior Publication Data
US 2017/0273768 A1  Sep. 28, 2017

Related U.S. Application Data

(60) Provisional application No. 62/050,788, filed on Sep. 16, 2014.

(51) Int. Cl.
*A61C 17/34* (2006.01)
*H02K 33/00* (2006.01)

(52) U.S. Cl.
CPC .......... *A61C 17/34* (2013.01); *A61C 17/3418* (2013.01); *A61C 17/3481* (2013.01); *H02K 33/00* (2013.01)

(58) Field of Classification Search
CPC . A61C 17/34; A61C 17/3418; A61C 17/3481; H02K 33/00; A46B 15/0002; A46B 15/0001; A46B 13/00
(Continued)

(56) References Cited

U.S. PATENT DOCUMENTS 5,189,751 A * 3/1993 Giuliani ................. A61C 17/20
15/22.1
5,613,259 A * 3/1997 Craft ................... A61C 17/3481
15/22.1
(Continued)

FOREIGN PATENT DOCUMENTS

EP  2407124 A1  1/2012
EP  2550940 A2  1/2013
(Continued)

*Primary Examiner* — Joseph J Hail
*Assistant Examiner* — Arman Milanian

(57) ABSTRACT

A personal care appliance (10) comprises a handle (12), an attachment (14), and a controller (16). The handle (12) includes an actuator (20) and drive shaft (22). The attachment (14) has a body (30) with a principal axis (32) extending between a proximal end and a distal end thereof, wherein the proximal end couples to the drive shaft. The attachment (14) further includes a mass-spring identifiable assembly (40) having at least one identifiable resonant frequency in response to a given excitation, wherein the at least one identifiable resonant frequency comprises a resonant frequency selected from at least two different resonant frequencies. The controller (16) is configured to control the attachment (14), via the actuator (20), over a predefined range of frequencies that includes the given excitation. The controller (16) is further configured, in at least a detection mode, to uniquely recognize the attachment (14) via detecting a presence of the at least one identifiable resonant frequency of the mass-spring identifiable assembly (40) of the attachment (14) in response to the given excitation.

13 Claims, 8 Drawing Sheets

(58) Field of Classification Search
USPC .................... 15/105, 106, 22.1, 23.1; 310/38
See application file for complete search history.

(56) References Cited

U.S. PATENT DOCUMENTS

| | | | |
|---|---|---|---|
| 6,195,828 B1 | 3/2001 | Fritsch | |
| 7,207,080 B2 | 4/2007 | Hilscher et al. | |
| 8,176,591 B2 | 5/2012 | Iwahori et al. | |
| 8,479,341 B2* | 7/2013 | Iwahori | A46B 15/0006 15/22.1 |
| 9,237,943 B2* | 1/2016 | Graeve | A46B 5/0095 |
| 9,301,822 B2* | 4/2016 | Grez | F16F 7/104 |
| 2003/0011569 A1 | 1/2003 | Onodera | |
| 2004/0000016 A1* | 1/2004 | Miller | A61C 17/22 15/22.1 |
| 2008/0209650 A1* | 9/2008 | Brewer | A46B 15/0002 15/22.1 |
| 2009/0019651 A1* | 1/2009 | Grez | A61C 17/222 15/22.1 |
| 2009/0025156 A1* | 1/2009 | Asada | A61C 17/3472 15/22.1 |
| 2010/0237720 A1* | 9/2010 | Taylor | A61C 17/20 310/38 |
| 2010/0277013 A1* | 11/2010 | Jungnickel | A61C 17/3418 310/37 |
| 2011/0005015 A1 | 1/2011 | Iwahori et al. | |
| 2011/0107536 A1* | 5/2011 | Dabrowski | A61C 17/222 15/167.1 |
| 2012/0234349 A1 | 9/2012 | Pruett | |
| 2013/0029289 A1* | 1/2013 | Utsch | A61C 17/222 433/146 |
| 2013/0239342 A1* | 9/2013 | Hilscher | A61B 18/1402 15/22.1 |

FOREIGN PATENT DOCUMENTS

| | | |
|---|---|---|
| RU | 2011141867 A | 4/2013 |
| WO | 9533419 A1 | 12/1995 |
| WO | 2013061196 A2 | 5/2013 |

* cited by examiner

ATTACHMENT WITH IDENTIFICATION FOR PERSONAL CARE APPLIANCE AND METHOD

CROSS-REFERENCE TO PRIOR APPLICATIONS

This application is the U.S. National Phase application under 35 U.S.C. § 371 of International Application No. PCT/IB2015/056073, filed on Aug. 10, 2015 which claims the benefit of U.S. Provisional Patent Application No. 62/050,788, filed on Sep. 16, 2014. These applications are hereby incorporated by reference herein.

The present embodiments relate generally to personal care appliances and more particularly, to a mass-spring identifiable attachment for a personal care appliance and a method of implementing the same.

In electrical or power toothbrushes, a resonant drive is often applied for driving an attachment, such as a brush head. The use of a resonant drive in a power toothbrush makes it possible to reach operating frequencies of 200-400 Hz. The resonant system of the power toothbrush comprises a mechanical mass-spring which is driven by an actuator. An electronic driving circuit of the power toothbrush operates the resonant system close to its resonance, so that the stroke stability and the efficiency of the brush head become as high as possible.

Power toothbrushes generally make use of disposable brush heads. A disposable brush head is meant for use by one person; however, the handle of the power toothbrush can be used by more than one person in a given family. In the later instance, each person has to recognize his/her own disposable brush head. To assist the users, the disposable brush heads are sometimes provided with a specific distinguishing mark, such as different color rings.

Various methods have been defined regarding how information between a brush head and handle of a power toothbrush can be transferred. In one method, a conductive connection can be used, or a wireless link. In another method, an optical system could be used for the data transfer, or a system that works with coupled (i.e., magnetic) fields. A principal disadvantage of such methods is that they are costly and/or require a lot of space in the context of a personal care appliance, such as a power toothbrush.

Accordingly, an improved method and apparatus for overcoming the problems in the art is desired.

In accordance with one aspect, a personal care appliance is disclosed which comprises a handle, an attachment, and a controller. The handle includes an actuator and drive shaft. The attachment has a body with a principal axis extending between a proximal end and a distal end thereof, wherein the proximal end couples to the drive shaft. The attachment further includes a mass-spring identifiable assembly having at least one identifiable resonant frequency in response to a given excitation, wherein the at least one identifiable resonant frequency comprises a resonant frequency selected from at least two different resonant frequencies. The controller is configured to control the attachment, via the actuator, over a predefined range of frequencies that includes the given excitation. The controller is further configured, in at least a detection mode, to uniquely recognize the attachment via detecting a presence of the at least one identifiable resonant frequency of the mass-spring identifiable assembly of the attachment in response to the given excitation.

In accordance with another aspect, the actuator comprises a permanent magnet resonant actuator having a principal coil, wherein the permanent magnet resonant actuator with principal coil is operable as a sensing device. In addition, the controller is further configured to use the permanent magnet resonant actuator with principal coil as the sensing device in the detecting of a presence of an identifiable resonant frequency of a mass-spring identifiable assembly.

In accordance with another aspect, the mass-spring identifiable assembly comprises at least one selected from the group consisting of: (i) a distinct mass and spring component and (ii) a three-dimensional configuration (i.e., shape) of the body. With respect to one embodiment of a mass-spring identifiable assembly that comprises a distinct mass and spring component, the distinct mass and spring component can include a ring mass centered about the principal axis and mechanically coupled to the body via leaf springs. In a further embodiment, the leaf springs comprise one selected from the group consisting of (i) leaf springs that extend radially outward from an outer perimeter surface of the ring mass and (ii) leaf springs that extend from at least one surface of the ring mass in a direction along the principal axis.

In another further embodiment, with respect to a mass-spring identifiable assembly that comprises the three-dimensional configuration of the body, the three-dimensional configuration of the body includes at least one feature configured to exhibit a resonant mode of the body that corresponds to the at least one identifiable resonant frequency of the mass-spring identifiable assembly.

According to another embodiment, the personal care appliance further comprises a sensing coil disposed adjacent to the drive shaft within the handle. With this embodiment, the controller is further configured to use the sensing coil in the detecting of the presence an identifiable resonant frequency of a mass-spring identifiable assembly.

According to yet another embodiment, the controller of the personal care appliance is further configured to perform, in a user mode, at least one operation or function of the personal care appliance in response to uniquely recognizing the attachment via the detection mode detecting the presence of the at least one identifiable resonant frequency of the mass-spring identifiable assembly. In one embodiment, the user mode comprises at least one selected from the group consisting of: (i) automatically selecting personalized user settings, (ii) monitoring a user behavior, (iii) collecting historic data, and (iv) any combination thereof.

According to a further embodiment, the personal care appliance wherein the controller, in at least the detection mode, is configured to recognize an attachment that comprises one of at least two distinct disposable units.

In another embodiment, the predefined range of frequencies, over which the controller controls the attachment, further comprises a principal functional frequency, wherein the at least one identifiable resonant frequency of the mass-spring identifiable assembly comprises a resonant frequency selected so that it is not disturbed by the principal functional frequency. For a principal functional frequency that occurs between (i) a first frequency and (ii) a second frequency that is higher than the first frequency (e.g., 200 to 300 Hz), the at least one identifiable resonant frequency comprises at least one resonant frequency selected from the group consisting of (i) a resonant frequency less than the first frequency (e.g., <200 Hz), (ii) a resonant frequency greater than the second frequency (e.g., >300 Hz), and (iii) a resonant frequency for which its detection is immune from a power transfer associated with an operation of the personal care appliance at the principal functional frequency.

In the context of a personal care appliance the embodiments of the present disclosure advantageously enable, not only the user, but also the personal care appliance handle to recognize the disposable attachment. Doing so opens up several possibilities. In one possibility, the handle can give the user feedback about the status of the disposable attachment (e.g., lifetime, integral operating time, or atachment behavior). In another possibility, the handle can automatically select special personal settings, as soon the disposable attachment is connected to the handle (e.g., dedicated movement, amplitude or frequency of the movement). In yet another possibility, the handle can also monitor use behaviour (e.g., a parent can see how often and/or how long their child brushes their teeth).

In accordance with another aspect, an attachment for a personal care appliance is disclosed which comprises a body with a principal axis extending between a proximal end and a distal end thereof, wherein the proximal end couples to a drive shaft of an actuator of the personal care appliance. The attachment further comprises a mass-spring identifiable assembly coupled to or coupled with the body, the mass-spring identifiable assembly having at least one identifiable resonant frequency in response to a given excitation, wherein the at least one identifiable resonant frequency comprises a resonant frequency selected from at least two different resonant frequencies. The attachment is preferably disposed to interact with the appliance, wherein a controller of the personal care appliance is configured to control the body and mass-spring identifiable assembly, via the actuator, over a predefined range of frequencies that includes the given excitation. The controller is further configured, in at least a detection mode, to uniquely recognize the attachment via detecting a presence of the at least one identifiable resonant frequency of the mass-spring identifiable assembly of the attachment in response to the given excitation.

In another embodiment with respect to the attachment, the mass-spring identifiable assembly comprises at least one selected from the group consisting of: (i) a distinct mass and spring component and (ii) a three-dimensional configuration of the body. In an embodiment wherein the mass-spring identifiable assembly comprises the distinct mass and spring component, the distinct mass and spring component can include a ring mass centered about the principal axis and mechanically coupled to the body via leaf springs. In a further embodiment, the leaf springs comprise one selected from the group consisting of (i) leaf springs that extend radially outward from an outer perimeter surface of the ring mass and (ii) leaf springs that extend from at least one surface of the ring mass in a direction along the principal axis. In yet another embodiment, the mass-spring identifiable assembly comprises the three-dimensional configuration of the body, wherein the three-dimensional configuration of the body includes at least one feature configured to exhibit a resonant mode of the body that corresponds to the at least one identifiable resonant frequency of the mass-spring identifiable assembly.

In a further embodiment with respect to the attachment, the predefined range of frequencies, over which the controller controls the body and mass-spring identifiable assembly of the attachment, via the actuator, further comprises a principal functional frequency, wherein the at least one identifiable resonant frequency of the mass-spring identifiable assembly comprises a resonant frequency selected so that it is not disturbed by the principal functional frequency. For a principal functional frequency between (i) a first frequency and (ii) a second frequency that is higher than the first frequency, the at least one identifiable resonant frequency comprises at least one resonant frequency selected from the group consisting of (i) a resonant frequency less than the first frequency, (ii) a resonant frequency greater than the second frequency, and (iii) a resonant frequency for which its detection is immune from a power transfer associated with an operation of the personal care appliance at the principal functional frequency.

In accordance with yet another aspect, a method of implementing mass-spring identification in a personal care appliance is disclosed. The method comprises providing a handle including an actuator and drive shaft. The method further comprises providing an attachment having a body with a principal axis extending between a proximal end and a distal end thereof, wherein the proximal end couples to the drive shaft, the attachment further including a mass-spring identifiable assembly having at least one identifiable resonant frequency in response to a given excitation, wherein the at least one identifiable resonant frequency comprises a resonant frequency selected from at least two different resonant frequencies. The method further comprises controlling, via the actuator and a controller, the attachment over a predefined range of frequencies that includes the given excitation, and further controlling, in at least a detection mode, to uniquely recognize the attachment via detecting a presence of the at least one identifiable resonant frequency of the mass-spring identifiable assembly of the attachment in response to the given excitation.

In accordance with yet another aspect of the method, the mass-spring identifiable assembly comprises at least one selected from the group consisting of: (i) a distinct mass and spring component, (ii) a ring mass, and (iii) a three-dimensional configuration of the body. With respect to a mass-spring identifiable assembly that comprises a ring mass, the ring mass is centered about the principal axis and mechanically coupled to the body via leaf springs. The leaf springs comprise one selected from the group consisting of (i) leaf springs that extend radially outward from an outer perimeter surface of the ring mass and (ii) leaf springs that extend from at least one surface of the ring mass in a direction along the principal axis. With respect to a mass-spring identifiable assembly that comprises a three-dimensional configuration of the body, the three-dimensional configuration of the body includes at least one feature configured to exhibit a resonant mode of the body that corresponds to the at least one identifiable resonant frequency of the mass-spring identifiable assembly. In addition, the predefined range of frequencies, over which the controller controls the attachment, further comprises a principal functional frequency, wherein the at least one identifiable resonant frequency of the mass-spring identifiable assembly comprises a resonant frequency selected so that it is not disturbed by the principal functional frequency. For a principal functional frequency between (i) a first frequency and (ii) a second frequency that is higher than the first frequency, the at least one identifiable resonant frequency comprises at least one resonant frequency selected from the group consisting of (i) a resonant frequency less than the first frequency, (ii) a resonant frequency greater than the second frequency, and (iii) a resonant frequency for which its detection is immune from a power transfer associated with an operation of the personal care appliance at the principal functional frequency.

The embodiments of the present disclosure advantageously solve the problem of providing an inexpensive solution for recognizing a disposable attachment and for which the solution also does not require a lot of extra space.

Still further advantages and benefits will become apparent to those of ordinary skill in the art upon reading and understanding the following detailed description.

The embodiments of the present disclosure may take form in various components and arrangements of components, and in various steps and arrangements of steps. Accordingly, the drawings are for purposes of illustrating the various embodiments and are not to be construed as limiting the embodiments. In the drawing figures, like reference numerals refer to like elements. In addition, it is to be noted that the figures may not be drawn to scale.

Figure 1:
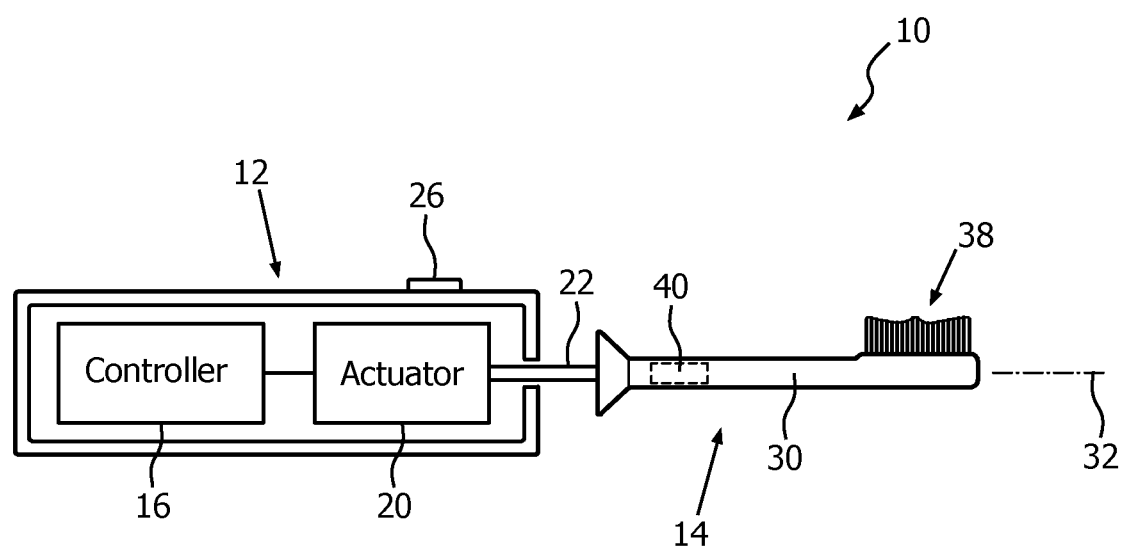
FIG. 1 is a schematic longitudinal sectional view of a personal care appliance having a handle section and an attachment including a mass-spring identifiable assembly attachable thereto, according to an embodiment of the present disclosure.

The embodiments of the present disclosure and the various features and advantageous details thereof are explained more fully with reference to the non-limiting examples that are described and/or illustrated in the drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the present disclosure. The examples used herein are intended merely to facilitate an understanding of ways in which the embodiments of the present may be practiced and to further enable those of skill in the art to practice the same. Accordingly, the examples herein should not be construed as limiting the scope of the embodiments of the present disclosure, which is defined solely by the appended claims and applicable law.

It is understood that the embodiments of the present disclosure are not limited to the particular methodology, protocols, devices, apparatus, materials, applications, etc., described herein, as these may vary. It is also to be understood that the terminology used herein is used for the purpose of describing particular embodiments only, and is not intended to be limiting in scope of the embodiments as claimed. It must be noted that as used herein and in the appended claims, the singular forms "a," "an," and "the" include plural reference unless the context clearly dictates otherwise.

Unless defined otherwise, all technical and scientific terms used herein have the same meanings as commonly understood by one of ordinary skill in the art to which the embodiments of the present disclosure belong. Preferred methods, devices, and materials are described, although any methods and materials similar or equivalent to those described herein can be used in the practice or testing of the embodiments.

According to one embodiment of the present disclosure, predefined mass-spring resonant properties are used in conjunction with a disposable brush head, and which can be recognized by control electronics in the power toothbrush handle via the main actuator of the power toothbrush handle. An advantage of this solution is that it provides a very inexpensive way of recognizing different disposable brush heads that doesn't require a lot of extra space. According to another embodiment, prescribed changes are made on the bristle side, i.e., with respect to the disposable brush head. The disposable brush head is provided with a pre-defined mass-spring mechanism in its design, which gives the corresponding brush head special resonant properties. In conjunction therewith, changes are also implemented on the handle side. The changes on the handle side include changes in the software and electronics (e.g., a coil on a printed circuit board, PCB).

Referring now to FIG. 1, there is shown a schematic longitudinal sectional view of a personal care appliance 10 that comprises a handle 12, and an attachment 14, according to an embodiment of the present disclosure. The handle 12 includes a controller 16, an actuator 20 and drive shaft 22. The drive shaft 22 extends outside the handle 12 at a distal end thereof. The attachment 14 has a body 30 with a principal axis 32 extending between a proximal end and a distal end thereof, wherein the proximal end couples, via a press fit or other suitable coupling mechanism, to the drive shaft 22 extending from the distal end of handle 12. In one embodiment, the attachment 14 includes a plurality of bristles 38 located at the distal end thereof. The attachment 14 further includes a mass-spring identifiable assembly 40 having at least one identifiable resonant frequency in response to a given excitation, wherein the at least one identifiable resonant frequency comprises a resonant frequency selected from at least two different resonant frequencies, as will be discussed further herein. The controller 16 (e.g., battery and control electronics) is configured to control the attachment 14, via the actuator 20, to produce one or more of various mechanical stimulus (e.g., rotary sweeping movement having a given resonant frequency). The controller 16 is further configured, in at least a detection mode, to uniquely recognize the attachment 14 via detecting a presence of the at least one identifiable resonant frequency of the mass-spring identifiable assembly 40 of the attachment 14 in response to the given excitation. The given excitation can include at least one of a plurality of resonant frequencies.

In one embodiment, the actuator 20 comprises a permanent-magnet resonant actuator that functions as a means that transfers energy from the electrical domain to the mechanical domain. In addition, the permanent-magnet resonant actuator can also act as a generator, whereby mechanical speed and torque can be recognized as voltages and currents in the electrical domain. Accordingly, the permanent-magnet resonant actuator can be used as a measuring device that senses the mechanical properties of the load connected to the personal care appliance 10, i.e., the attachment 14. More particularly, the actuator 20 comprises a permanent magnet resonant actuator having a principal coil (not shown), wherein the permanent magnet resonant actuator with principal coil is operable as a sensing device. In addition, the controller 16 is further configured to use the permanent magnet resonant actuator with principal coil as the sensing device in the detecting of a presence of an identifiable resonant frequency of a mass-spring identifiable assembly 40, e.g., corresponding to mass-spring properties of the attachment 14 coupled to the drive shaft 22, as will be discussed further herein. In other words, the controller 16 uses the permanent magnet resonant actuator with principal coil as a sensing device for determining an identifiable resonant frequency of the attachment 14.

With reference still to FIG. 1, in one embodiment, attachment 14 comprises a replaceable attachment that is subject to being replaced after a given useful lifetime or use duration. The personal care appliance 10 can comprise, for example, a power toothbrush.

In addition, the personal care appliance 10 further comprises an activation mechanism 26 (e.g., button, switch, or equivalent) that is operable between (i) an OFF state and (ii) at least one activation ON state. The at least one activation ON state includes a suitable procedure and/or control routine with respect to uniquely recognizing a given attachment in conjunction with a care routine and/or operation. Of course, a separate actuator (not shown) from the activation mechanism 26 can alternatively be employed to perform this function.

In one embodiment, controller 16 further comprises a motor controller for controlling an operation or operations of the actuator 20 to produce a desired mechanical stimulus according to the requirements of a given personal care appliance user routine. In another embodiment, the controller is configured for controlling an operation of the actuator between an OFF state and at least one of (i) a first personal care appliance user routine and (ii) a second personal care appliance user routine.

Figure 2:
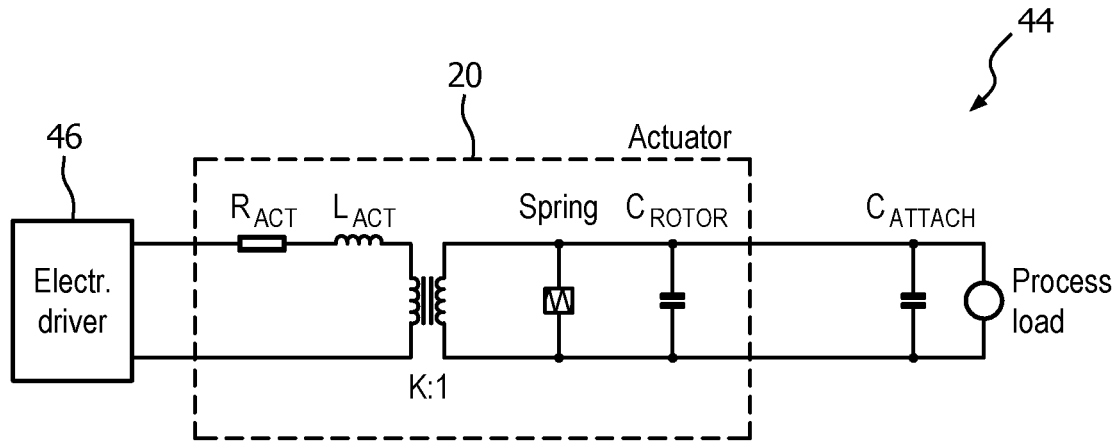
FIG. 2 is an equivalent schematic circuit representation view of an electric personal care appliance.

FIG. 2 illustrates a simple equivalent circuit representation 44 of a typical resonant actuator 20. The mechanical effects are given as equivalent electrical components (e.g., using electrical symbols, R, L, C, Load). In addition, the input impedance of the actuator 20 is not only dependent on the electrical components, but also on the mechanical components. Therefore, the electrical impedance at the actuator input will also be a function of the mechanical parts attached to its' output. The equivalent circuit representation 44 includes an electrical driver 46, actuator resistance $R_{ACT}$, actuator inductance $L_{ACT}$, a transformer (K:1), a spring, a rotor capacitance $C_{ROTOR}$, an attachment capacitance $C_{ATTACH}$, and a process load (PROCESS LOAD). Using this equivalent circuit representation, a resonance frequency of a mechanical mass-spring system on the output of the actuator is detectable in the actuator input impedance.

If the electrical, the magnetic and the mechanical properties of the actuator are well-known, it becomes possible to derive the mass moment of inertia of the attachment (e.g., a brush head) from the impedance. In this way, the actuator is used as a kind of sensor, in order to determine a property of the attachment coupled to the output of the actuator 20.

According to the embodiments of the present disclosure, the inventors have discovered a way to add a specific mechanical property to a brush head of a personal care appliance that can be well measured by this method. If various attachments have mass-springs of different resonant frequencies, the attachments can be distinguished from one another by the measuring method. In one embodiment, the predefined range of frequencies, over which the controller controls the attachment, comprises a principal functional frequency in a range between (i) a first frequency and (ii) a second frequency, higher than the first frequency (e.g., 200 to 300 Hz), and an identifiable resonant frequency in a range selected from the group consisting of (i) a resonant frequency less than the first frequency (e.g., <200 Hz) and (ii) a resonant frequency greater than the second frequency (e.g., >300 Hz). Other frequencies and ranges are possible, according to the particular implementation of the personal care appliance. In addition, the at least one identifiable resonant frequency of the mass-spring identifiable assembly can comprise a resonant frequency selected so that it is not disturbed by the principal functional frequency. In other words, the at least one identifiable resonant frequency of the mass-spring identifiable assembly can comprise a resonant frequency for which its detection is immune from a power transfer associated with an operation of the personal care appliance at the principal functional frequency.

Figure 3:
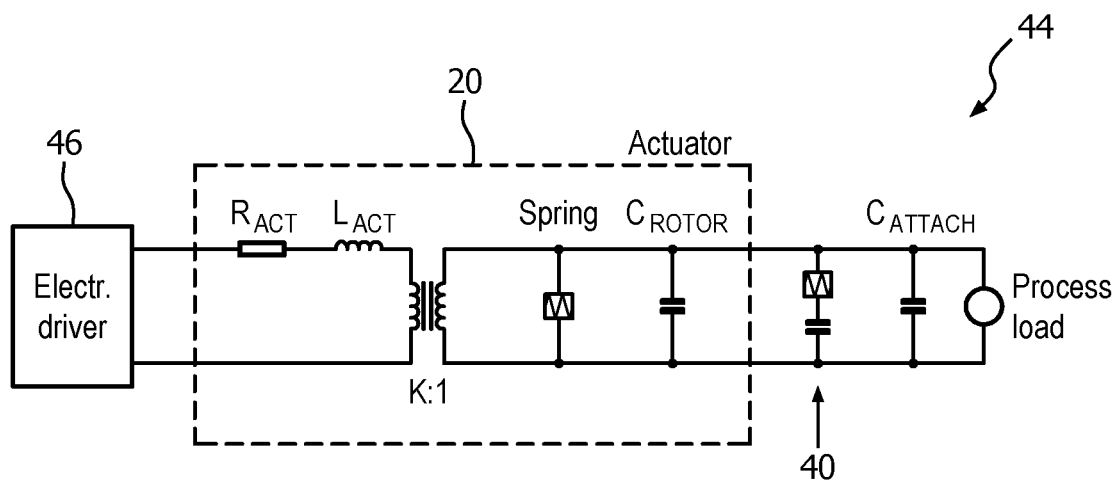
FIG. 3 is an equivalent schematic circuit representation view of an electric personal care appliance with the attachment including a mass-spring identifiable assembly according to an embodiment of the present disclosure.

In FIG. 3, the mass-spring system has been added to the equivalent schematic circuit representation view of the personal care appliance with the attachment including a mass-spring identifiable assembly represented by a series LC 40 according to an embodiment of the present disclosure.

As will be discussed herein below, the mass-spring identifiable assembly 40 comprises at least one selected from the group consisting of: (i) a ring mass spring component and (ii) a three-dimensional configuration (i.e., shape) of the body 30 (30A, 30B). With respect to a mass-spring identifiable assembly 40 that comprises a spring component 50 that includes a ring mass 51, the ring mass 51 is centered about the principal axis 32 and mechanically coupled to the body 30 via leaf springs 52. In a further embodiment, the leaf springs 52 comprise one selected from the group consisting of (i) leaf springs 52 that extend radially outward from an outer perimeter surface of the ring mass 51 and (ii) leaf springs 52 that extend from at least one surface of the ring mass 51 in a direction along the principal axis. Other embodimentsthe mass-spring identifiable assembly 40 can comprise a click-on recognizable body (which acts like a mass spring). The shape of such a click-on recognizable body does not necessarily need to be ring shaped but can be any shape, as long as its resonant frequency is recognizable. Any solid body has natural resonant frequencies (modes). The embodiments of the present disclosure make use of these frequencies to be recognized. In particular, the design of the attachment (e.g., the brush head for a power toothbrush) is such that resonant mode of the attachment occur at a desired frequency.

Figure 4:
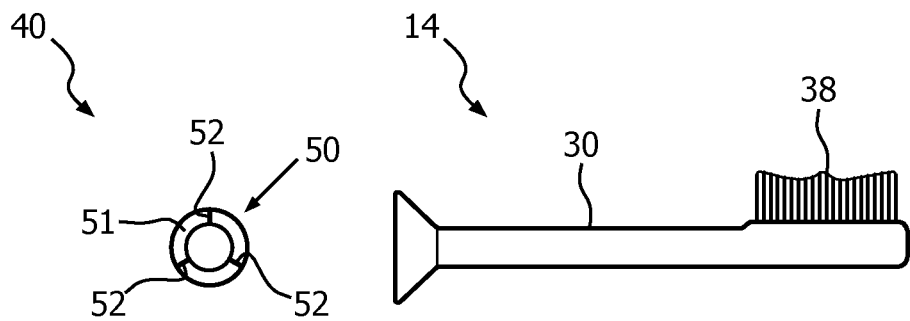
FIG. 4 is a perspective image view of a mass-spring identifiable assembly and an attachment according to an embodiment of the present disclosure.
Figure 5:
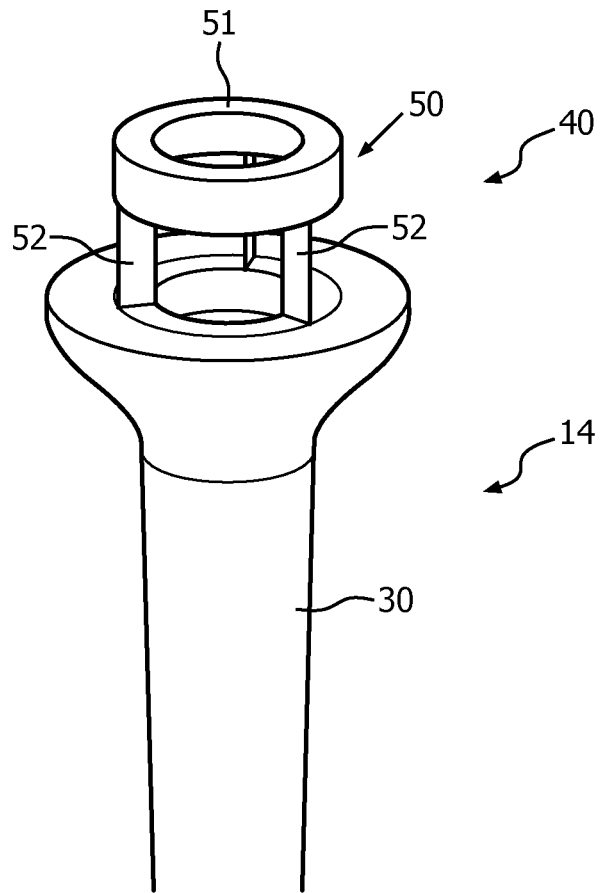
FIG. 5 is a perspective image view of the attachment and mass-spring identifiable assembly of FIG. 4 coupled together according to an embodiment of the present disclosure.

FIGS. 4 and 5 are perspective views of an embodiment of the attachment 14 and mass spring identifiable system 40 of the present invention. The mass spring identifiable system 40 comprises a spring component 50 that includes ring mass 51 which is connected to the attachment 14 via leaf springs

52. This design of the spring component 50 includes three (3) leaf springs 52, holding an inertial ring mass 51. FIG. 5 is a perspective image view of the attachment 14 and mass-spring identifiable assembly 40 coupled together according to an embodiment of the present disclosure.

Figure 7:
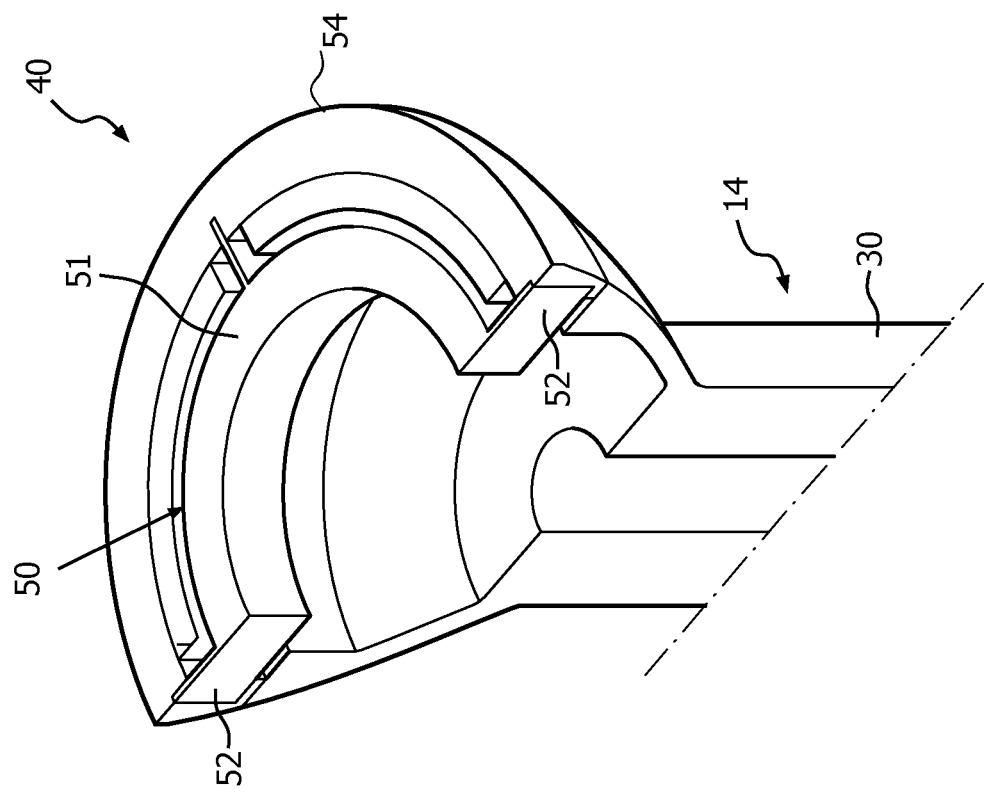
FIG. 7 is a sectional perspective image view of the attachment and mass-spring identifiable assembly of FIG. 6 according to an embodiment of the present disclosure.
Figure 6:
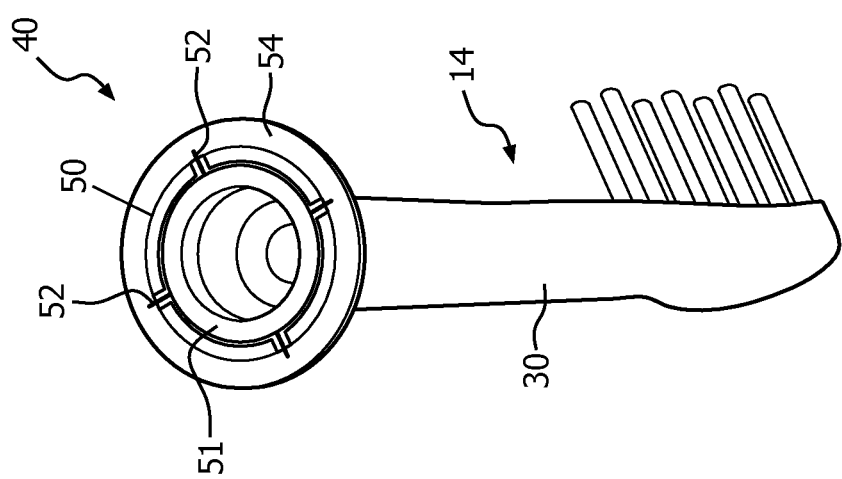
FIG. 6 is a perspective image view of the attachment and mass-spring identifiable assembly coupled together according to another embodiment of the present disclosure.

Turning now to FIG. 6, there is shown a perspective view of the attachment 14 and mass-spring identifiable assembly 40 coupled together according to another embodiment of the present disclosure. In addition, FIG. 7 shows a sectional perspective image view of the attachment 14 and mass-spring identifiable assembly 40 of FIG. 6 according to an embodiment of the present disclosure. In other words, in the arrangement shown in FIG. 6 and FIG. 7, the mass-spring is located within an inside portion of the brush head and only a color ring 54 will be visible for the user or consumer, in contrast to the arrangmeent shown in FIG. 5. An advantage of the embodiment of FIG. 6 and FIG. 7 is that the main portion of the attachment can remain the same and only the mass-spring identifiable assembly 40 (e.g., in the form of a mass-spring "click-on") is user specific.

Figure 8A:
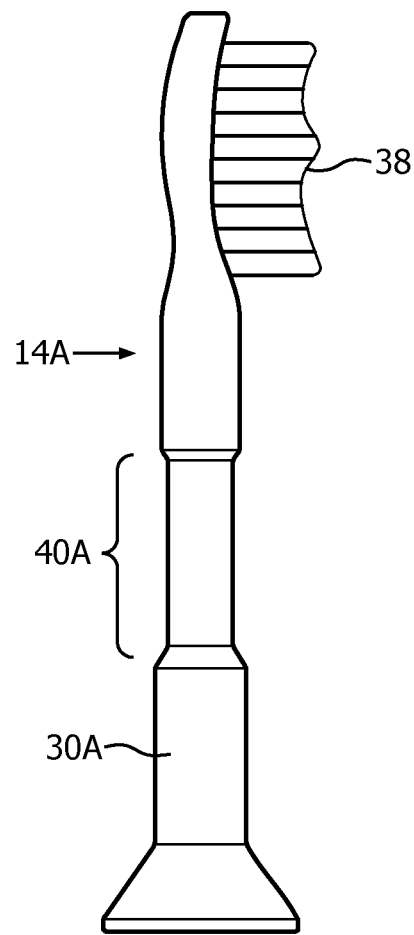
FIGS. 8A and 8B are longitudinal sectional view of an attachment including a mass-spring identifiable assembly according to embodiments of the present disclosure.
Figure 8B:
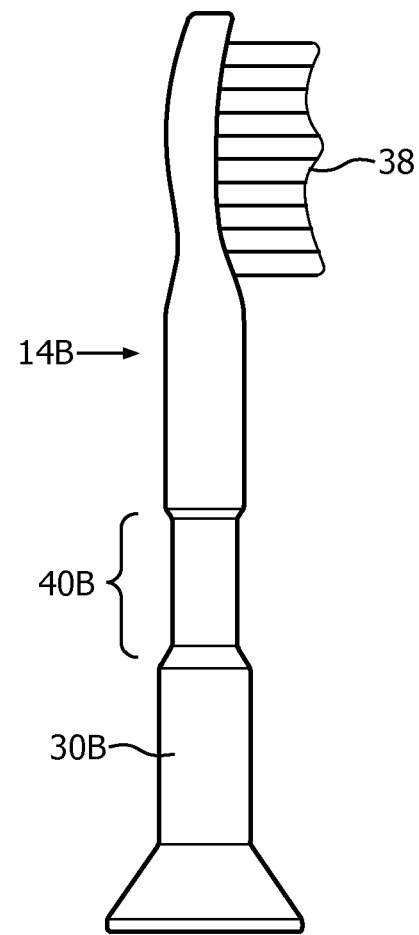

In another embodiment, a mass-spring identifiable assembly 40 is part of the three-dimensional configuration of the attachment body 30 (generally indicated by reference numerals 40A and 40B in FIGS. 8A and 8B). The resonant mode of the body corresponds to (i.e., is similar to) at least one identifiable resonant frequency of the mass-spring identifiable assembly (40). The mass-spring identifiable assembly 40 comprises the three-dimensional configuration (30A, 30B) of the body, wherein the three-dimensional configuration of the body includes at least one feature (40A,40B) configured to exhibit a resonant mode of the body that corresponds to the at least one identifiable resonant frequency of the mass-spring identifiable assembly 40.

Referring now to FIGS. 8A and 8B, there is shown is a longitudinal sectional view of an attachment 14A, 14B including a mass-spring identifiable assembly 40A, 40B according to another embodiment of the present disclosure. By introducing varying body designs, the embodiments of the present disclosure could also detect the specific resonance provided via the body design 30A, 30B. In addition, this embodiment would be more visible to the consumer.

With respect to the embodiments discussed earlier herein, those embodiments rely on an impedance measurement. However, circuit impedance induced by the resonant actuator can be dominated by the actuator resistance and self-inductance. As a result, it may become difficult to distinguish the resonant peaks of the added mass-spring system. In another embodiment, a measurement more close to the moving part is implemented. In particular, an improvement can be made by placing a sensing coil in the actuator, which receives the time-varying flux caused by the mechanical motion, as will be discussed below in connection with FIG. 9. The actuator can be provided with a sensing coil 58 for detecting the mass-spring identifiable assembly 40 resonance.

Figure 9:
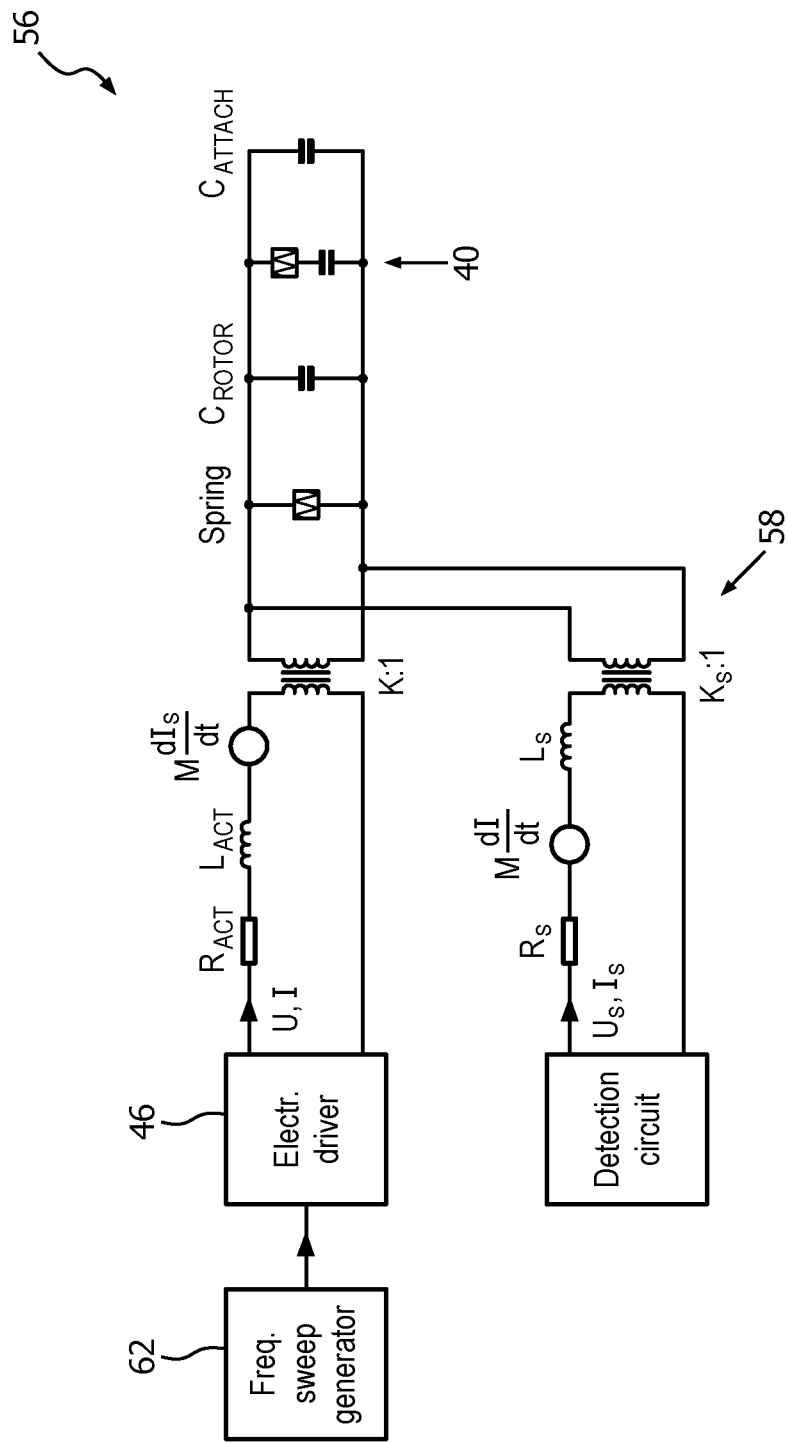
FIG. 9 is an equivalent schematic circuit representation view of an electric personal care appliance with the attachment including a mass-spring identifiable assembly, and a sensing coil, according to an embodiment of the present disclosure.

With reference to FIG. 9, there is shown an equivalent schematic circuit diagram 56 representation of to personal care appliance including a mass-spring identifiable assembly 40, and a sensing coil 58, according to an embodiment of the present disclosure. In particular, a sensing coil is disposed adjacent to the drive shaft within the handle, wherein the controller is further configured to use the sensing coil in the detecting of the presence an identifiable resonant frequency of a mass-spring identifiable assembly. The sensing coil is utilized by the controller for detecting the presence of the at least one identifiable resonant frequency of the mass-spring identifiable assembly 40.

The sensing coil 58 is coupled to the magnetic system, so that it optimally receives the time-varying flux from the moving parts. The resistance ($R_S$) and self-inductance ($L_S$) of the sensing coil do not influence the signal, because the current in this sensing coil is zero. However, the sensing coil will be coupled to the main coil. Nevertheless, the resonance peak of the added mass-spring identifiable assembly 40 is better visible now, i.e., identifiable.

The sweep generator 62 performs a frequency sweep over a range where the resonances are to be expected. These resonance frequencies are preferably chosen to be higher or lower than the main resonance of the system. In this manner, the operating resonance of the personal care appliance is not disturbing the frequency sweep measurement. In other words, an identifiable resonance frequency of the added mass-spring identifiable assembly 40 of the embodiments of the present disclosure is selected such that the principal functional resonance of the personal care appliance does not disturb the detection of the identifiable resonance frequency. The identifiable resonant frequency is thus selected as a resonant frequency for which its detection is immune from a power transfer associated with an operation of the personal care appliance at the principal functional frequency.

Figure 10:
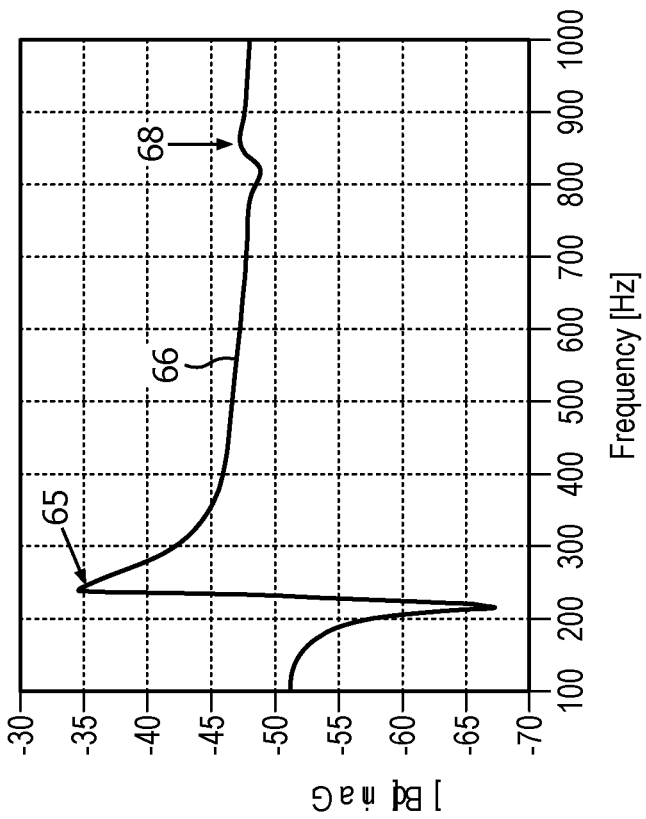
FIG. 10 (10A) is a graph representation view and (10B) a perspective image view of an attachment without a mass-spring identifiable assembly.
Figure 10:
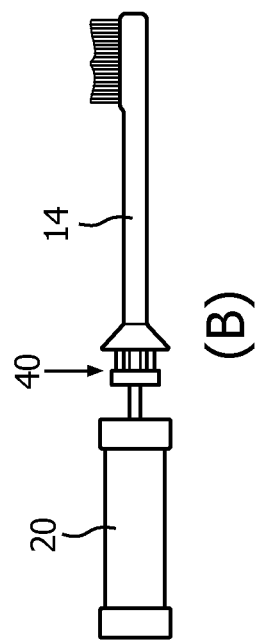
Figure 11:
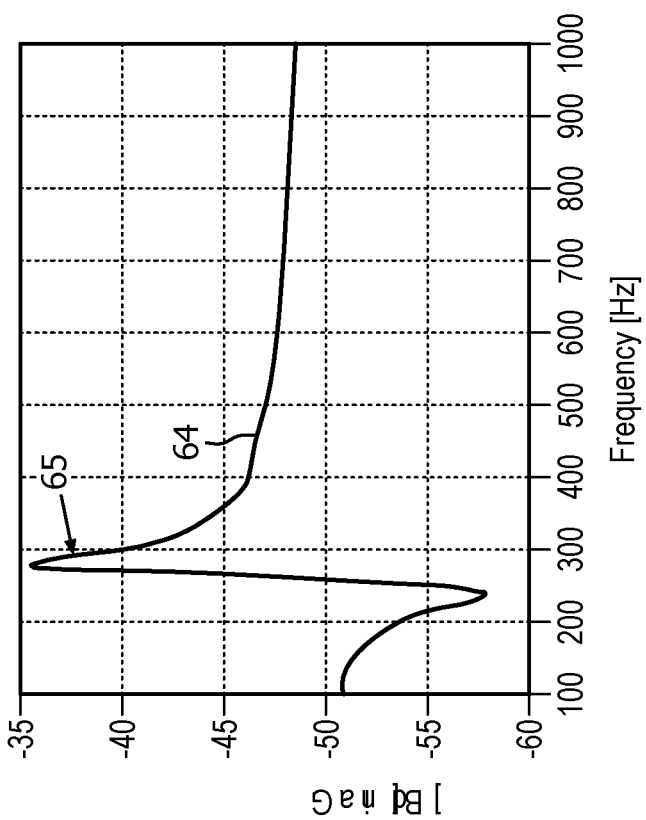
FIG. 11 (11A) is a graph representation view and (11B) a perspective image view of an attachment including a mass-spring identifiable assembly according to an embodiment of the present disclosure.
Figure 11:
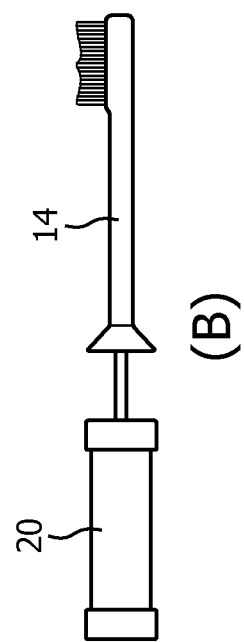

FIG. 10 (10A) is a graph representation view (i.e., a frequency sweep measurement) and (10B) a perspective image view of an attachment without a mass-spring identifiable assembly. FIG. 11 (11A) is a graph representation view (i.e., a frequency sweep measurement) and (11B) a perspective image view of an attachment including a mass-spring identifiable assembly 40 according to an embodiment of the present disclosure. FIG. 10A illustrates a voltage gain (dB) curve 64 over a frequency range of 100 to 1000 Hz for an attachment without a mass-spring identifiable assembly of FIG. 10B. FIG. 11A illustrates a voltage gain (dB) curve 66 over a frequency range of 100 to 1000 Hz for an attachment with a mass-spring identifiable assembly 40 of FIG. 11B. In both illustrations, normal operation is conducted at a principal functional frequency proximate the large resonant peak 65 shown in FIGS. 10A and 11A, between 200 to 300 Hz, and more particularly, at about 260-290 Hz.

In FIG. 11A, one can clearly see that the addition of the mass spring identifiable assembly adds a resonant peak 68 to the voltage gain 66 sensed by the sensing coil. The consumer will hardly notice this "measuring sweep" since it uses only a short time and can be done, e.g., either before or while the brush head is already in the user's mouth. The illustration in FIG. 11A is only one example. Other resonant peaks are possible, i.e., at least two different resonant peaks are implemented to distinguish between at least two attachments. In addition, the particular implementation of a detection mode by the controller of the personal care appliance is determined according to the requirements of a particular personal care appliance application. For example, the execution of a frequency sweep for the detection mode can be implemented prior to use of the personal care appliance by a user, i.e., in response to the personal care appliance being picked up by the user. Motion detectors can be included within the handle for sensing the motion of the handle being picked up. Another possibility would be to perform a detection sweep every second in response to a motion sensor sensing a motion trigger and the personal care appliance not yet being switched on. Yet another possibility would be to perform a detection sweep in response to a user putting on another brush head, i.e., in response to detecting a higher than normal axial force. Other implementations of the detection mode are also possible.

With reference again to FIGS. 10 and 11, frequency-sweep measurements on a personal care appliance actuator are shown. The measured transfer is from the main coil voltage to the sensing coil voltage. The graph of FIG. 10A shows the result for an actuator with a normal attachment (without a mass-spring identifiable assembly), whereas, the graph of FIG. 11A corresponds to an actuator with the attachment provided with the mass-spring system. In an actual application, in one embodiment, the controller drives the actuator to perform the detection sweep directly in response to a sensed actuation of the personal care appliance ON-button. After the detection sweep is finished and the controller completes the attachment detection, the controller again switches on the main actuator of the personal care appliance at the normal brushing frequency, whereupon the normal operation begins.

One embodiment of the particular operating frequency range of the embodiments of the present disclosure is also shown in FIGS. 10A and 11A. A large resonant frequency peak, indicated by reference numeral 65, at about 260 Hertz is near the normal use operational frequency of the device (i.e., near the principal functional frequency). FIG. 11A further illustrates another resonant peak 68 at about 850 Hz which identifies the attachment 14 with mass-spring identifiable assembly 40.

According to yet another embodiment, the controller 16 of the personal care appliance 10 is further configured to perform, in a user mode, at least one operation or function of the personal care appliance in response to uniquely recognizing the attachment via the detection mode detecting the presence of at least one identifiable resonant frequency of the mass-spring identifiable assembly 40, wherein the at least one identifiable resonant frequency comprises a resonant frequency selected from at least two different resonant frequencies. In other words, responsive to recognizing the attachment 14, the controller 16 operates in a specific user mode of the personal care appliance as a function of the attachment recognized. In one embodiment, the user mode comprises at least one selected from the group consisting of: (i) automatically selecting personalized user settings, (ii) monitoring a user behavior, (iii) collecting historic data, and (iv) any combination thereof. Historic data can include, for example, device wear data, useful lifetime, etc.

In the examples discussed herein above, the system has been used for a power toothbrush, wherein the controller, in at least the detection mode, is configured to recognize an attachment that comprises a brush head selected from at least two distinct disposable brush heads. However, the system could also be used for other personal care appliances with resonant actuators or pumps. For example, the personal care appliance could comprise a shaver with "unit recognition," etc. With respect to a power shaver, the controller, in at least the detection mode, is configured to recognize an attachment that comprises a shaver-unit selected from at least two distinct disposable shaver-units. In one embodiment, a disposable shaver-unit comprises a configuration of multiple shaver heads that include cutting elements. For instance, a shaver unit can comprise three heads. Other configurations are also possible.

In accordance with another embodiment, an attachment 14 for a personal care appliance 10 is disclosed which comprises a body 30 with a principal axis 32 extending between a proximal end and a distal end thereof, wherein the proximal end couples to a drive shaft 22 of an actuator 20 of the personal care appliance 10. The attachment 14 further comprises a mass-spring identifiable assembly 40 coupled to or coupled with the body 30, the mass-spring identifiable assembly having one of at least two identifiable resonant frequencies in response to a given excitation, wherein a controller 16 of the personal care appliance 10 is configured to control the body 30 and mass-spring identifiable assembly 40, via the actuator 20, over a predefined range of frequencies that includes the given excitation, and wherein the controller 16 is further configured, in at least a detection mode, to uniquely recognize the attachment 14 via detecting a presence of one of the at least two identifiable resonant frequencies of the mass-spring identifiable assembly of the attachment in response to the given excitation.

In a further embodiment with respect to the attachment 14, the predefined range of frequencies, over which the controller 16 controls the body 30 and mass-spring identifiable assembly 40, via the actuator 20, further comprises a principal functional frequency. The principal functional frequency occurs between (i) a first frequency and (ii) a second frequency that is higher than the first frequency, and an identifiable resonant frequency of the at least one identifiable resonant frequency comprises at least one resonant frequency selected from the group consisting of (i) a resonant frequency less than the first frequency, (ii) a resonant frequency greater than the second frequency, and (iii) a resonant frequency for which its detection is immune from a power transfer associated with an operation of the personal care appliance at the principal functional frequency.

Figure 12:
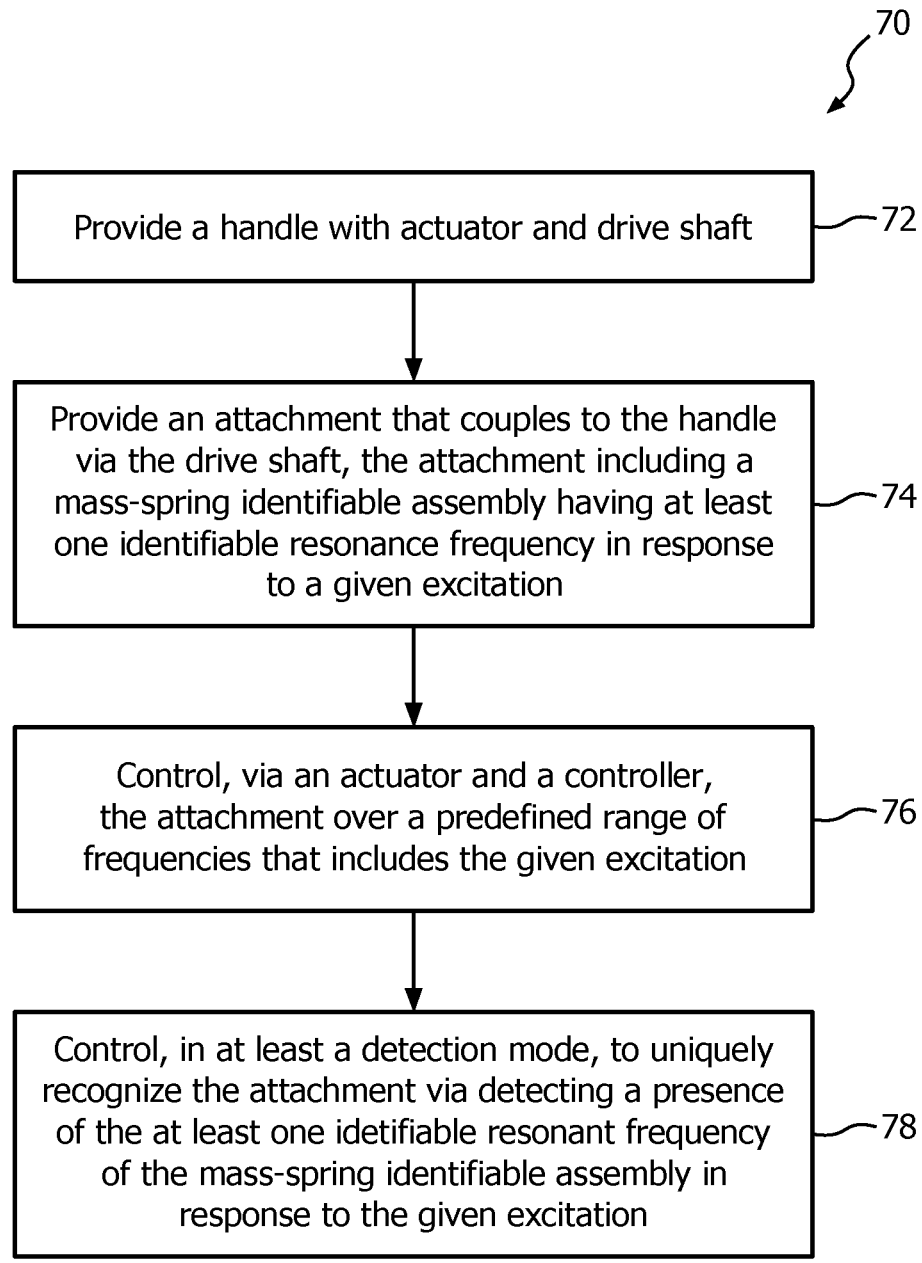
FIG. 12 is a flow diagram view of a method according to an embodiment of the present disclosure.

With reference now to FIG. 12, in accordance with yet another embodiment, a method 70 of implementing mass-spring identification in a personal care appliance comprises the acts of providing a handle including an actuator and drive shaft (Step 72). The method further comprises coupling an attachment having a mass spring identifiable assembly to the handle via the drive shaft (Step 74). The attachment further including a mass-spring identifiable assembly having one of at least two identifiable resonant frequencies in response to a given excitation. The method further comprises controlling, via the actuator and a controller, the attachment over a predefined range of frequencies that includes the given excitation (Step 76), and further controlling, in at least a detection mode, to uniquely recognize the attachment via detecting a presence of one of the at least two identifiable resonant frequencies of the mass-spring identifiable assembly of the attachment in response to the given excitation (Step 78).

Although only a few exemplary embodiments have been described in detail above, those skilled in the art will readily appreciate that many modifications are possible in the exemplary embodiments without materially departing from the novel teachings and advantages of the embodiments of the present disclosure. For example, the embodiments of the present disclosure can be advantageously used in power toothbrush applications. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

In addition, any reference signs placed in parentheses in one or more claims shall not be construed as limiting the claims. The word "comprising" and "comprises," and the like, does not exclude the presence of elements or steps other than those listed in any claim or the specification as a whole. The singular reference of an element does not exclude the plural references of such elements and vice-versa. One or more of the embodiments may be implemented by means of hardware comprising several distinct elements, and/or by means of a suitably programmed computer. In a device claim enumerating several means, several of these means may be embodied by one and the same item of hardware. The mere fact that certain measures are recited in mutually different dependent claims does not indicate that a combination of these measures cannot be used to an advantage.

The invention claimed is:

1. A personal care appliance, comprising:
   a handle including an actuator and drive shaft;
   an attachment having a body with a principal axis extending between a proximal end and a distal end thereof, wherein the proximal end couples to the drive shaft, the attachment further including a mass-spring identifiable assembly having at least one identifiable resonant frequency in response to a given excitation, wherein the at least one identifiable resonant frequency comprises a resonant frequency selected from at least two different resonant frequencies; and
   a controller configured to control the attachment, via the actuator, over a predefined range of frequencies that includes the given excitation, and wherein the controller is further configured, in at least a detection mode, to uniquely recognize the attachment via detecting a presence of the at least one identifiable resonant frequency of the mass-spring identifiable assembly of the attachment in response to the given excitation;
   wherein the mass-spring identifiable assembly comprises at least one of: (i) a ring mass-spring component comprising a ring mass having an at least one surface and at least one leaf spring secured to the at least one surface, the at least one leaf spring further secured between the at least one surface and the body; and (ii) a three-dimensional configuration of the body comprising a first portion having a first substantially uniform diameter and a second portion having a second substantially uniform diameter where the first substantially uniform diameter is less than the second substantially uniform diameter.

2. The personal care appliance of claim 1, wherein the actuator comprises a permanent magnet resonant actuator having a principal coil, wherein the permanent magnet resonant actuator with principal coil is operable as a sensing device.

3. The personal care appliance of claim 2, wherein the controller is further configured to use the permanent magnet resonant actuator with principal coil as the sensing device in the detecting of a presence of an identifiable resonant frequency of a mass-spring identifiable assembly.

4. The personal care appliance of claim 1, wherein the mass-spring identifiable assembly comprises the ring mass-spring component, which comprises the ring mass and wherein the ring mass is centered about the principal axis and mechanically coupled to the body via the at least one leaf spring.

5. The personal care appliance of claim 4, wherein the at least one leaf spring comprises: (i) leaf springs that extend radially outward from the at least one surface, where the at least one surface is an outer perimeter surface of the ring mass or (ii) leaf springs that extend from the at least one surface of the ring mass in a direction along the principal axis.

6. The personal care appliance of claim 1, further comprising: a sensing coil disposed adjacent to the drive shaft within the handle, wherein the controller is further configured to use the sensing coil in the detecting of the presence an identifiable resonant frequency of the mass-spring identifiable assembly.

7. The personal care appliance of claim 1, wherein the controller is further configured to perform, in a user mode, at least one operation of the personal care appliance selected from the group consisting of: (i) automatically selecting personalized user settings, (ii) monitoring a user behavior, (iii) collecting historic data, and (iv) any combination thereof in response to uniquely recognizing the attachment via the detection mode detecting the presence of the at least one identifiable resonant frequency of the mass-spring identifiable assembly.

8. The personal care appliance of claim 1, wherein the predefined range of frequencies, over which the controller controls the attachment, further includes a principal functional frequency that occurs between (i) a first frequency and (ii) a second frequency that is higher than the first frequency, and wherein the at least one identifiable resonant frequency comprises at least one resonant frequency selected from the group consisting of (i) a resonant frequency less than the first frequency, (ii) a resonant frequency greater than the second frequency, and (iii) a resonant frequency that is not disturbed by the principal functional frequency of the personal care appliance.

9. An attachment for a personal care appliance that comprises a handle including an actuator with a drive shaft and a controller configured to control the attachment, via the actuator, over a predefined range of frequencies that includes a given excitation, wherein the controller is further configured, in at least a detection mode, to uniquely recognize the attachment via detecting a presence of at least one identifiable resonant frequency of the attachment in response to the given excitation, the attachment comprising:
   a body with a principal axis extending between a proximal end and a distal end thereof, wherein the proximal end couples to the drive shaft of the actuator of the personal care appliance; and
   a mass-spring identifiable assembly coupled to the body, the mass-spring identifiable assembly having the at least one identifiable resonant frequency in response to the given excitation, wherein the at least one identifiable resonant frequency comprises a resonant frequency selected from at least two different resonant frequencies;
   wherein the mass-spring identifiable assembly comprises a three-dimensional configuration of the body comprising a first portion having a first substantially uniform diameter and a second portion having a second substantially uniform diameter where the first substantially uniform diameter is less than the second substantially uniform diameter.

10. The attachment of claim 9, wherein the mass-spring identifiable assembly comprises a ring mass-spring component, which comprises a distinct mass and spring component having a ring mass centered about the principal axis and mechanically coupled to the body via leaf springs.

11. The attachment of claim 10, wherein the leaf springs comprise one selected from the group consisting of (i) leaf springs that extend radially outward from an outer perimeter surface of the ring mass and (ii) leaf springs that extend from at least one surface of the ring mass in a direction along the principal axis.

12. The attachment of claim 9, wherein the predefined range of frequencies, over which the controller controls the body and mass-spring identifiable assembly, via the actuator, further includes a principal functional frequency that occurs between (i) a first frequency and (ii) a second frequency that is higher than the first frequency, and wherein the at least one identifiable resonant frequency comprises at least one resonant frequency selected from the group consisting of (i) a resonant frequency less than the first frequency, (ii) a resonant frequency greater than the second frequency, and (iii) a resonant frequency that is not disturbed by the principal functional frequency of the personal care appliance.

13. A personal care appliance, comprising:
a handle including an actuator and drive shaft;
an attachment having a body with a principal axis extending between a proximal end and a distal end thereof, wherein the proximal end couples to the drive shaft, the attachment further including a mass-spring identifiable assembly having at least one identifiable resonant frequency in response to a given excitation, wherein the at least one identifiable resonant frequency comprises a resonant frequency selected from at least two different resonant frequencies; and
a controller configured to control the attachment, via the actuator, over a predefined range of frequencies that includes the given excitation, and wherein the controller is further configured, in at least a detection mode, to uniquely recognize the attachment via detecting a presence of the at least one identifiable resonant frequency of the mass-spring identifiable assembly of the attachment in response to the given excitation;
wherein the mass-spring identifiable assembly comprises at least one of: (i) a ring mass-spring component comprising a ring mass having an at least one surface and at least one leaf spring secured to the at least one surface, the at least one leaf spring further secured between the at least one surface and the body; and (ii) a three-dimensional configuration of the body comprising a first portion having a first substantially uniform diameter and a second portion having a second substantially uniform diameter where the first substantially uniform diameter is less than the second substantially uniform diameter,
and wherein the predefined range of frequencies, over which the controller controls the attachment, further includes a principal functional frequency that occurs between a first frequency and a second frequency that is higher than the first frequency, and wherein the at least one identifiable resonant frequency comprises at least one resonant frequency selected from the group consisting of a resonant frequency less than the first frequency, a resonant frequency greater than the second frequency, and a resonant frequency that is not disturbed by the principal functional frequency of the personal care appliance.

\* \* \* \* \*